United States Patent [19]

Matsumoto et al.

[11] Patent Number: 5,047,106
[45] Date of Patent: Sep. 10, 1991

[54] METHOD FOR FABRICATING A FLEXBEAM OF A HELICOPTER ROTOR BLADE

[75] Inventors: Tadahiro Matsumoto; Kiyoshi Nishikawa, both of Tokyo, Japan

[73] Assignee: Fuji Jukogyo Kabushiki Kaisha, Tokyo, Japan

[21] Appl. No.: 422,222

[22] Filed: Oct. 16, 1989

Related U.S. Application Data

[62] Division of Ser. No. 294,259, Jan. 5, 1989, Pat. No. 4,892,461.

[30] Foreign Application Priority Data

Jan. 8, 1988 [JP] Japan .................. 63-1831

[51] Int. Cl.[5] .................. B29C 43/20; B29C 53/56
[52] U.S. Cl. .................. 156/169; 156/245; 264/258
[58] Field of Search .................. 156/169, 245, 175; 264/258; 416/134 A, 141 R, 230 A

[56] References Cited

U.S. PATENT DOCUMENTS

| | | | |
|---|---|---|---|
| 3,330,362 | 5/1966 | Kastan | 416/141 |
| 4,163,630 | 8/1979 | Weiland | 416/134 A |
| 4,251,309 | 2/1981 | Class et al. | 416/230 |
| 4,352,631 | 10/1982 | Buchs et al. | 416/134 A |
| 4,386,989 | 6/1983 | Aubry | 416/230 |
| 4,407,688 | 10/1983 | Mussi et al. | 416/230 |
| 4,427,340 | 1/1984 | Metzger et al. | 416/134 A |
| 4,542,567 | 9/1985 | McArdle et al. | 416/134 A |
| 4,648,800 | 3/1987 | Fradenburgh et al. | 416/134 A |
| 4,650,401 | 3/1987 | Yao et al. | 416/134 A |
| 4,676,720 | 6/1987 | Niwa et al. | 416/134 A |
| 4,746,272 | 5/1988 | Noehren et al. | 416/134 A |
| 4,792,280 | 12/1988 | Olsen et al. | 416/134 A |

FOREIGN PATENT DOCUMENTS

| | | | |
|---|---|---|---|
| 2823389 | 12/1979 | Fed. Rep. of Germany | 416/134 A |
| 2033861 | 5/1980 | United Kingdom | 416/134 A |

Primary Examiner—Michael W. Ball
Assistant Examiner—Steven D. Maki
Attorney, Agent, or Firm—Beveridge, DeGrandi & Weilacher

[57] ABSTRACT

A flexbeam for rotor blades of a helicopter comprises a flapping flexible structure forming a mast mounting and flapping part, a flexible structure forming a feathering and lead-lag motion part coupled with the flapping flexible structure, and a rotor blade mounting part located at the free end of the flexible structure and adapted to be coupled with a rotor blade. The feathering and lead-lag motion part comprises an elongated central member made of a composite fiber material, and a pair of elongated frame members disposed along the longitudinal sides of the central member. The frame members are each made of loops of unidirectional composite fiber material and has a Y-shaped cross section. The feathering and lead-lag motion part is fabricated by integrally joining the central member and the frame members along the longitudinal sides of the latter. The Y-shaped cross section has a pair of parallel ribs extending away from the central member. The above construction enables easy fabrication and reduction of weight of the flexbeam.

2 Claims, 2 Drawing Sheets

METHOD FOR FABRICATING A FLEXBEAM OF A HELICOPTER ROTOR BLADE

This is a divisional of co-pending application Ser. No. 07/294,259 filed 1-5-89 now U.S. Pat. No. 4,892,461.

BACKGROUND OF THE INVENTION

This invention relates to a flexbeam for rotor blades of a helicopter and a method for the fabrication thereof and, more particularly, to a flexbeam of a hub structure provided with no bearing means and its fabrication method.

A helicopter rotor usually has a plurality of rotor blades, typically four in a cruciform shape, wherein the opposed blades are supported by flexible beams or flexbeam to be rotatable about the axis of rotation of a rotor mast. The flexbeam reacts against the centrifugal force between opposite blades and may terminate at a convenient radial position.

The flexbeam is generally classified into two types. One has a hub structure provided with bearing means, and the other has a hub structure provided with no bearing means. The flexbeam having the hub structure but no bearing means, for supporting the rotor blades of the helicopter, comprises a flapping flexible structure disposed at the central portion of the rotor blades in a cruciform configuration, as an example, and an flexible structure extending outwardly from the flapping flexible structure and including a part subjected to feathering and lead-lag motion, which is called a feathering and lead-lag motion part.

U.S. Pat. No. 4,427,340 to Metzger et al discloses a flexbeam of the type described above having an flexible structure in which a plurality of parallel ribs extend in the longitudinal direction of the rotor blade of the helicopter and are located in predetermined planes of rotation with spaces therebetween, with a total of eight upper and lower ribs being provided. The ribs thus arranged constitute a reinforced composite integral rib structure, which allows the flexbeam to be easily twisted, and an imaginary hinge portion for the flexbeam is formed for reducing the lead-lag rigidity.

Japanese Patent Laid-open Publication (Kokai) No. 55-145811 published Nov. 13, 1980 also discloses a flexbeam which is formed of a fiber composite material having a T-shape or cruciform cross-sectional shape, and in which some members and parts of the composite fiber material as well as joining portions thereof are formed with slits so as to allow the flexbeam to be readily twisted.

The structures of the flexbeams disclosed in the prior art references cited above, however, involve problems about weight reduction thereof as well as the productivity or manufacturing cost thereof.

SUMMARY OF THE INVENTION

A first object of this invention is to solve the problems of the conventional technique described above and to provide a flexbeam for rotor blades of a helicopter having a structure of light weight and capable of being easily fabricated.

A second object of this invention is to provide a method for fabricating a flexbeam of the above character.

The first object of this invention can be achieved by providing a flexbeam for rotor blades of a helicopter comprising a mast mounting and flapping part, a feathering and lead-lag motion part integrally joined to said mast mounting and flapping part, the feathering and lead-lag motion part comprising a plate like central member made of a composite fiber material, and a pair of frame members disposed along longitudinal sides of the central member, the frame members being made of loops of unidirectional composite fiber material and each having a Y-shaped cross section, the central member and the frame members being joined integrally along both longitudinal side portions of the central member, and a rotor blade mounting part joined to that end of the feathering and lead-lag motion part, opposite to said mast mounting and flapping part, and adapted to be coupled to a rotor blade.

According to the flexbeam described above, the central member made of the composite fiber material and the frame members made of unidirectional composite fiber material are effective for resisting shearing stresses due to torsional forces and for axial stresses due to bending forces, respectively, so that the flexbeam is provided with a twistable structure without inside stress and made in thinner structure to be easily formed in a desired configuration.

The second object of this invention can be achieved by a method for fabricating a flexbeam for a rotor blade of a helicopter which comprises a flexible mast mounting and flapping part, an flexible feathering and lead-lag motion part coupled with said mast mounting and flapping part, and a rotor blade mounting part joined to an end of said feathering and lead-lag motion part which is opposite to said mast mounting and flapping part and which is adapted to be coupled to the rotor blades, said method being characterized by the steps of: preparing an elongated plate-like central member made of a composite fiber material; preparing a pair of elongated frame members made of loops of unidirectional composite fiber materials; placing said central member and said frame members in a mold with the frame members disposed in closely adjoining relationship with the longitudinal sides of the central member; and molding the central member and the frame members to integrally join each other and to form each of the frame members into a Y-shaped cross sectional with a spaced apart pair of thin ribs extending away from the central members in the feathering and lead-lag motion part.

Preferred embodiments of this invention will be described further in detail hereunder with reference to the accompanying drawings.

DESCRIPTION OF THE PREFERRED EMBODIMENTS

One embodiment of a flexbeam for a rotor blade of a helicopter according to the invention will be described below with reference to FIGS. 1 to 7.

Figure 1:
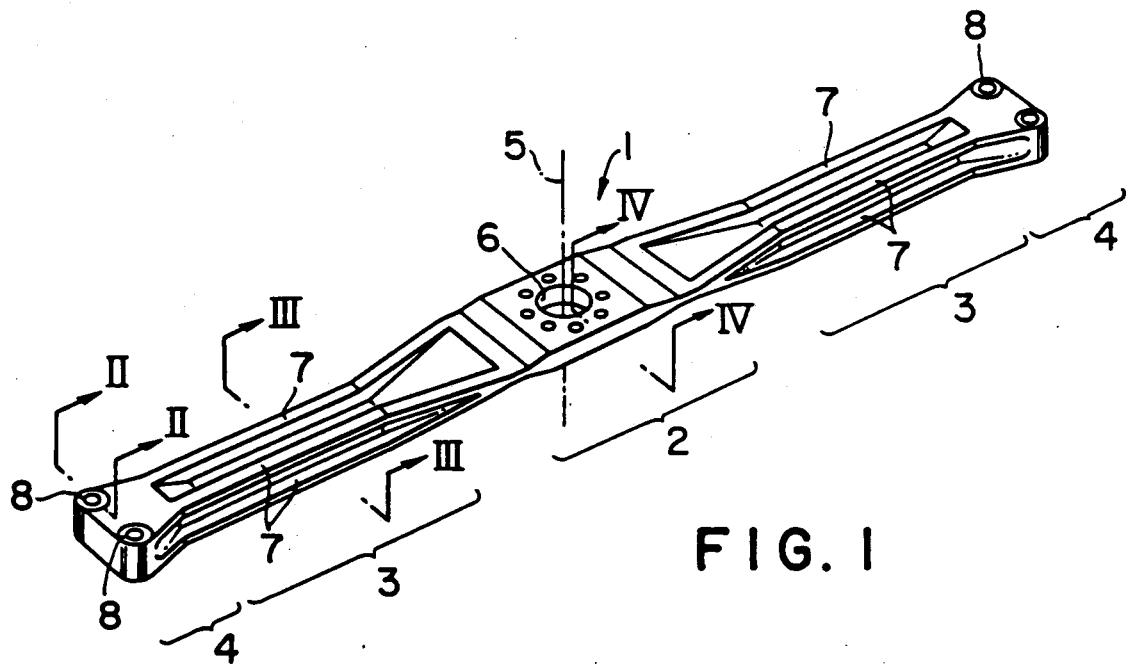
FIG. 1 is a perspective view of a flexbeam according to one embodiment of this invention.

As shown in FIG. 1, the flexbeam generally designated by numeral 1 comprises a mast mounting and flapping part 2, feathering and lead-lag motion parts 3, and rotor blade mounting parts 4 each in the form of a flat boss member connected to the respective free ends of the lead-lag motion parts. The mast mounting and flapping part is a flapping flexible structure in the form of a flat boss member disposed at the central portion, of the flexbeam arrangement. The feathering and lead-lag motion parts 3 are flexible structures extending in opposing directions from the part 2.

The mast mounting and flapping part 2 is provided with a through hole 6 at the central portion of the flexbeam to be mounted on the mast (not shown) of the helicopter. Each of the feathering and lead-lag motion parts 3 has a substantially H-shaped cross section as shown in FIG. 3, having upper and lower four thin ribs 7 extending in horizontal directions, i.e. in the rotor blade rotating direction. Each of the rotor blade mounting parts 4 has a metallic bush 8 inserted therein and extended vertically for the full thickness of the rotor blade mounting part 4 (see FIG. 2).

Figure 5:
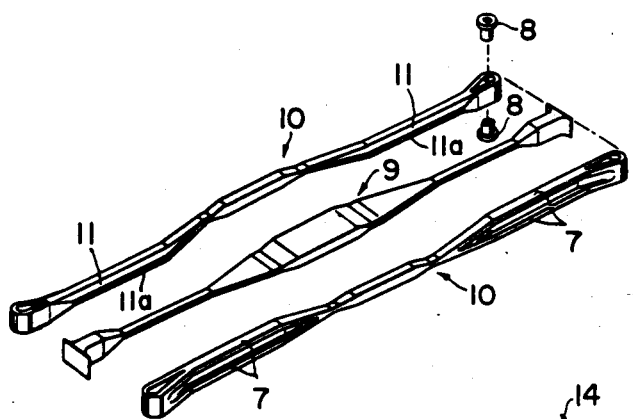
FIG. 5 is a perspective view of a central member and frame members in separate state constituting the flexbeam shown in FIG. 1.

The flexbeam 1 is fabricated, as shown in FIG. 5, from a central member 9 made of a woven composite fiber material, and a pair of longitudinally extending frame members 10 disposed along both sides of the central member 9. Each of the frame members 10 is formed of loops at both ends and has a Y-shaped cross section in the region corresponding to the part 3. These members 9 and 10 are formed integrally in a mold and connected with each other along the edges 11a of leg portions 11 of the frame members 10 and the longitudinal opposing surface portions thereof.

Figure 7:
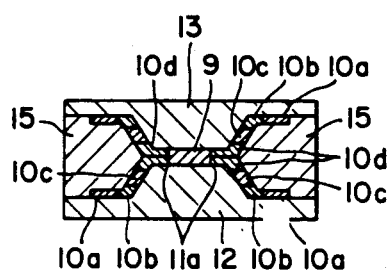
FIG. 7 is cross sectional view showing the state of integrally molding the central member and the frame members in a mold.

The molding operation of the three members 9 and 10, 10 is performed in accordance with the following processes. A pre-preg material of glass fiber, for example, is preliminarily cured to form the central member 9, which is then positioned between lower and upper mold halves 12 and 13 as shown in FIG. 7.

Figure 6:
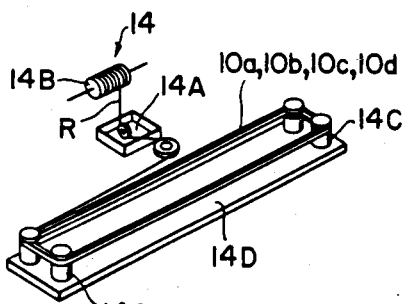
FIG. 6 is a perspective view of a forming device used for forming the frame member from looped elements.

The frame member 10 is formed in accordance with the manner shown in FIG. 6. That is, a fiber reinforced plastic (FRP) roving R is paid out from a reel 14B of a filament winding machine 14 and passed through an impregnation vessel 14A to be impregnated with an epoxy resin, which is contained in the vessel 14A, as an example. The roving R thus impregnated with the epoxy resin is then stretched around pins 14C standing at four corners of a board member 14D, while being half-cured, to be formed into mutually adjoining and adhering loops of roving 10a, 10b, . . . . The half-cured looped rovings are then removed from the pins 14C and therefater placed as they are looped in the mold, as shown in FIG. 7, to be located on the two lateral sides of the central member 9, which is also placed in the mold, in such a manner that the looped rovings are engaged with the metallic bushes 8, which are also placed in the mold, at the end portions thereof. The looped rovings 10a, 10b, . . . and the central member 9 thus set between the mold halves 12 and 13 are than pressed and molded by applying side mold halves 15 as shown in FIG. 7 to be formed into a flexbeam 1.

Figure 2:
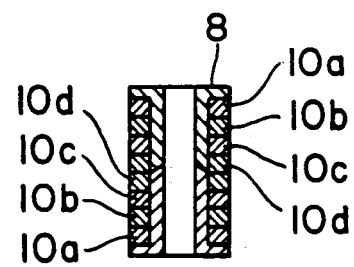
FIGS. 2, 3, and 4 are cross sectional views taken along the lines II—II, III—III, and IV—IV, respectively, shown if FIG 1.
Figure 3:
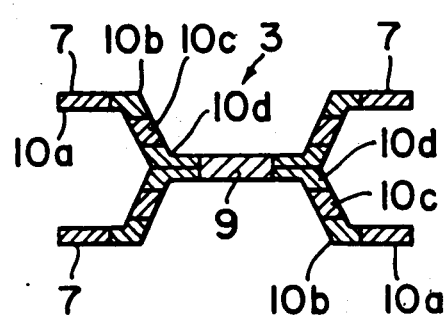
Figure 4:
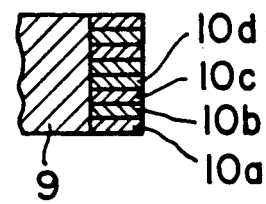

The frame members 10 thus molded integrally with central member 9, have non-uniform cross sections along the longitudinal direction thereof as shown in FIGS. 2 to 4, and the respective fiber materials 10a, 10b, 10c, 10d, . . . forming a unidirectional member have paths different from each other. Accordingly, the respective fiber materials have lengths different from each other, so that it is impossible to form the frame member 10 from only one loop. The frame member 10 can thus be formed by the combined use of various kinds of looped members in conformity with the paths.

According to this embodiment, each of the frame member 10 has cross sectional shapes symmetrical in the vertically and longitudinal directions as viewed, and therefore, the frame member 10 is constituted by four kinds of looped members 10a, 10b, 10c and 10d, i.e. a total of eight looped members, which have lengths different from each other. The frame member 10 can be easily formed by laying the respective looped members 10a to 10d in this order to the predetermined positions in the mold 12, 13 and 15.

According to this embodiment, the two feathering and lead-lag motion parts 3 are coupled with both the ends of the mast mounting and flapping part 2 to form a single flexbeam 1, and therefore an overlapped arrangement of a pair of the thus formed flexbeam 1 constitutes blade rotors having four blades.

Figure 8:
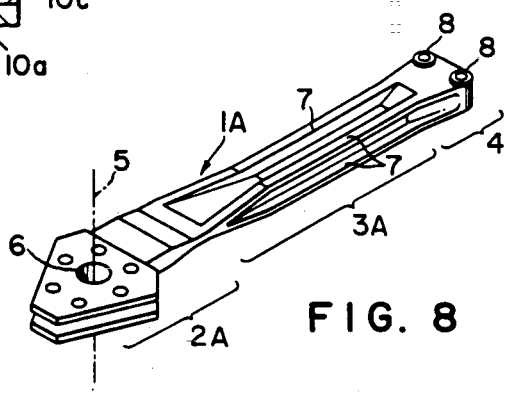
FIG. 8 is a perspective view of a flexbeam according to another embodiment of this invention.

FIG. 8 shows a perspective view of a flexbeam for a rotor blade of a helicopter according to another embodiment of this invention, in which a feathering and lead-lag motion part 3A is coupled with only one end of a masting mounting and flapping part 2A to constitute a flexbeam 1A. In the embodiment illustrated in FIG. 8, the mast mounting and flapping part 2A is provided with three sides, so that three flexbeam 1A can be mounted via fittings (not shown) to the mast mounting and flapping part 2A arranged centrally of the three flexbeams, whereby the three rotor blades can be mounted thereto.

According to the flexbeams for the rotor blades of a helicopter of the embodiment having constructions described above, the flexbeam can be provided with relatively long cross sectional size in the direction of rotation thereof, so that the required lead-lag rigidity can be achieved with a small cross sectional area, whereby the flexbeam can be constructed so as to have a light weight. In addition, since the vertical spaces between the respectively rib elements 7 can be relatively freely set, the required flapping rigidity can also be attained without substantially changing the lead-lag rigidity.

Moreover, from a view point of the strength, the central member made of the composite fiber material is utilized mainly for resisting shearing stresses due to torsional forces, and the frame members made of the unidirectional composite fiber material are utilized mainly for resisting axial stresses due to bending forces, so that the cross sectional thickness of the entire combined elements can be made to have a thin structure, the entire structure of the flexbeam can be made to be twisted easily, and the stresses applied thereto can be reduced without having to provide any slits or the like.

The central member is easily manufactured with the desired dimensions since it is made of the composite fiber material and can be utilized as a core when the central member is located in the mold, so that the area of the projecting four rib elements is enough to ensure the integral molding of the flexbeam structure in predetermined positions. An abtuse formation of the fillet portions of the respective rib elements ensures easy pressing operation and easy departing operation of the product from the mold.

furthermore, the frame member having rib elements made of the unidirectional composite fiber material can be effectively bear centrifugal forces, so that the frame member can be constructed to from a bilateral pair of flexbeams supporting the rotor blades respectively with the centrally arranged mast mounting and flapping part in-between, or to form a plurality of cantilevered flexbeams including looped materials engaging a metalic bush arranged centrally, whereby any numbers of blade rotors can be mounted.

What is claimed is:

1. A method for fabricating a flexbeam of a helicopter rotor blade, said flexbeam comprising a mast mounting and flapping part connecting to a mast of a helicopter, a feathering and lead-lag motion part connected to an outer end of said mast mounting and flapping part, and a rotor blade mounting part connected to another end of said feathering and lead-lag motion part, opposite to said outer end, for installing said helicopter rotor blade at a pair of bushes provided in a distal end of said rotor blade mounting part, said method comprising:

placing between upper and lower mold halves a preliminarily cured central member of elongated plate shape made of a pre-preg composite material;

placing between said upper and lower mold halves two pairs of the bushes at the two longitudinal end portions of the central member;

preparing loops of roving of half-cured composite material of different length;

laying said loops of different lengths along each longitudinal side of said center member such that said loops are laminated in order of length along cavity portions of Y-shaped cross section between the upper and lower mold halves while encircling two bushes which face longitudinally each other;

setting side mold halves on respective outside of said loops laminated at said laying step, each mold half having a shape corresponding to each cavity portion of Y-shaped cross section; and molding said central member and said loops within said upper and lower mold halves and said side mold halves to form an integral flexbeam with ribs of Y-shaped cross section.

2. The method according to claim 1 wherein said preparing step further comprising:

providing a filament winding machine including a board member, four pins standing at four corners of said board member, a vessel containing an epoxy resin and a reel binding fiber reinforced plastic roving;

impregnating said roving paid out from said reel with said epoxy resin in said vessel; and stretching and winding said roving coming out from vessel around said four pins to be formed into mutually adjoining and adhering loops.

* * * * *